United States Patent [19]
Goodman et al.

[11] 4,126,384
[45] Nov. 21, 1978

[54] SELF-ILLUMINATED LIQUID CRYSTAL DISPLAY DEVICE

[75] Inventors: Lawrence A. Goodman; Kenneth W. Hang, both of East Windsor; William B. Hall, Stockton, all of N.J.

[73] Assignee: RCA Corporation, New York, N.Y.

[21] Appl. No.: 714,121

[22] Filed: Aug. 13, 1976

[51] Int. Cl.² ............................................... G02F 1/13
[52] U.S. Cl. .................................. 350/345; 250/462; 250/467
[58] Field of Search ........................ 350/160 LC, 345; 250/462, 467

[56] References Cited

U.S. PATENT DOCUMENTS

| | | | |
|---|---|---|---|
| 3,841,083 | 10/1974 | Bergey | 350/160 LC X |
| 3,897,137 | 7/1975 | Dobbins | 350/160 LC |
| 3,920,996 | 11/1975 | Moore | 350/160 LC X |
| 3,998,526 | 12/1976 | Katz | 350/160 LC |

Primary Examiner—Edward S. Bauer
Attorney, Agent, or Firm—H. Christoffersen; Birgit E. Morris

[57] ABSTRACT

A liquid crystal device includes a liquid crystal material encapsulated between two glass plates having electrodes on their inner surfaces. An illuminator is provided across the back of the liquid crystal device. The illuminator includes a radioactive material encapsulated between two glass plates. The inner surface of the illuminator plates are coated with a cathodoluminescent phosphor. One of the plates of the illuminator may be one of the plates of the liquid crystal device. The photons from the phosphor of the illuminator illuminate the liquid crystal device.

8 Claims, 3 Drawing Figures

SELF-ILLUMINATED LIQUID CRYSTAL DISPLAY DEVICE

BACKGROUND OF THE INVENTION

The present invention relates to a self-illuminated liquid crystal device and particularly to such a device in which the luminating means is self-powered.

Recently liquid crystal devices have come into use as displays for electronic watches, clocks and the like. Liquid crystal devices do not emit light, but rely on outside illumination transmitted through or reflected off of the device. Thus, liquid crystal devices are more legible in moderate to bright ambient illumination and are not very visible in dim ambient lighting or complete darkness.

In order to provide suitable illumination for a liquid crystal device in dim ambient lighting or darkness, a small light bulb has been mounted behind the device. To conserve power the light bulb is usually connected through a switch to a source of current, generally the battery that also operates the liquid crystal device. Thus, when additional illumination of the liquid crystal device is required it can be achieved by closing the switch. Although this does provide the desired illumination of the device when required, the bulb does use some of the power which would otherwise be used to operate the liquid crystal device. Also, it requires the operation of the switch which may not always be easily done, especially when the liquid crystal device is used as a watch display.

Another type of illumination which has been used in a liquid crystal device is shown and described in U.S. Pat. No. 3,722,206 to J. M. Bergey issued Mar. 27, 1973 entitled, "Self-Illuminated Liquid Crystal Time Piece". This type of illumination includes an enclosed glass tube coated on its inner surface with a cathodoluminescent phospher and filled with a radioactive gas, such as tritium. The radioactive gas emits low energy beta particles which strike the phosphor and thereby induce the emission of visible radiation. This radiation illuminates the liquid crystal device. This type of illumination has the advantage over a bulb in that it is self-powered and requires no switch. However, at present, it can only be made in small sizes and it provides only a low level of illumination, about 0.1 foot-lambert. Thus, several of these tubes, two or three, have been used across a liquid crystal display device to illuminate the entire display. However, the overall light from the tubes is not uniform because of non-luminous regions between the tubes so that the display device is not uniformly illuminated.

SUMMARY OF THE INVENTION

A liquid crystal display device includes a pair of plates of transparent material having opposed, substantially flat surfaces in spaced apart relation. Electrodes are on each of the opposed surfaces of the plates and a liquid crystal material is between the opposed surfaces. An illuminator extends across one of the plates. The illuminator includes a pair of plates of transparent material having opposed surfaces in spaced apart relation, a cathodoluminescent phosphor on at least one of the opposed surfaces and a radioactive material between the plates.

DETAILED DESCRIPTION

Figure 1:
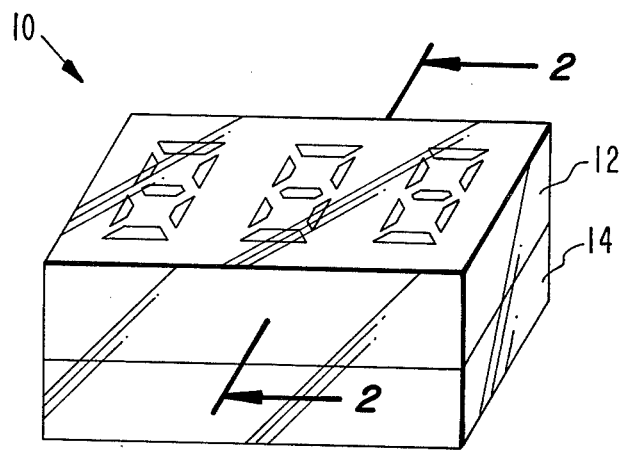
FIG. 1 is a perspective view of one form of the liquid crystal device of the present invention.

Referring initially to FIG. 1, one form of the liquid crystal display device of the present invention is generally designated as 10. The liquid crystal display device 10 comprises a liquid crystal cell 12 and an illuminator 14 extending across the back of the liquid crystal cell 12.

Figure 2:
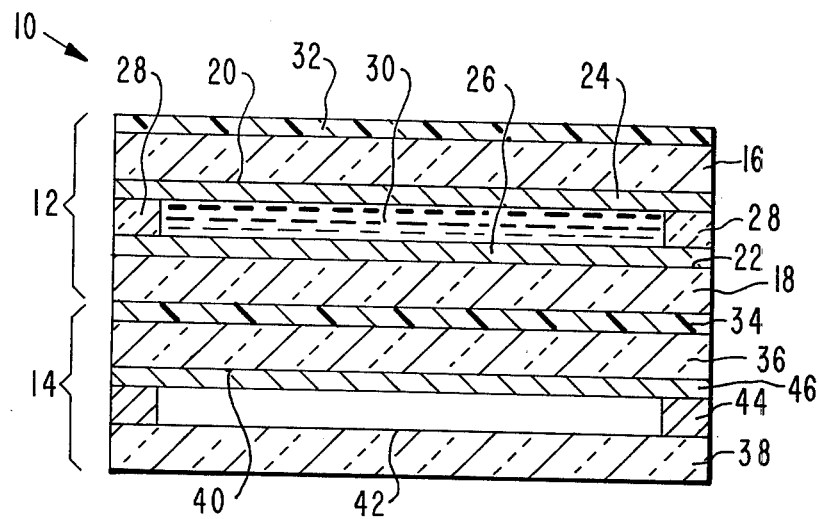
FIG. 2 is a sectional view taken along line 2—2 of FIG. 1.

Referring to FIG. 2, the liquid crystal cell 12 includes a pair of flat plates 16 and 18 of a transparent material, such as glass, having opposed, substantially flat surfaces 20 and 22 respectively in spaced apart relation. Transparent electrodes 24 and 26 of an electrically conductive material, such as a metal or tin oxide, are on the surfaces 20 and 22 of the plates 16 and 18 respectively. At least one of the electrodes 24 and 26 is defined to form an alpha-numeric pattern. A seal 28 is between the plates 16 and 18 around their periphery. The seal 28 holds the plates 16 and 18 in spaced apart relation and hermetically seals the space between the plates. The seal 28 may be of any material which will form a hermetic seal, such as a plastic or glass. The space between the plates 16 and 18 is filled with a liquid crystal material 30, e.g., a nematic liquid crystal material. Layers 32 and 34 of a polarizing material may be provided on the outer surfaces of the plates 16 and 18 respectively.

The illuminator 14 comprises a pair of spaced plates 36 and 38 of transparent material, such as glass, having opposed surfaces 40 and 42 respectively in spaced apart relation. A seal 44, of metal or glass, extends between the plates 36 and 38 around their entire periphery. A layer 46 of a cathodoluminescent phosphor is on the surface 40 of the plate 36. If desired, the surface 42 of the plate 38 may also be coated with a layer of the phosphor. The space between the plates 36 and 38 is filled with a radioactive gas, such as tritium.

The glass plates 36 and 38 of the illuminator 14 should be of a glass which is substantially free of alkali metal ions at least at the opposing surfaces 40 and 42 so as to minimize susceptibility to possible segregation of the glass as a result of being bombarded by radiation from the radioactive gas. Although the glass plates 36 and 38 may be of an alkali free glass, such as a borosilicate glass, it is preferable to make them of a less expensive soda-lime glass which has the alkali metal ions removed at the opposed surfaces 40 and 42. An inexpensive method of removing alkali metal ions from the surface of such a glass is the method of surface ion-depletion as described in U.S. Pat. No. 3,811,855 to David E. Carlson, et al., issued May 21, 1974, entitled, "Method of Treating Glass Body to Provide an Ion-Depleted Region Therein". The glass plates 36 and 38 can be easily treated to remove the alkali ions from the surfaces 40 and 42 before the plates are assembled into the illuminator 14.

The illuminator 14 is of the same size and shape as the liquid crystal cell 12 so as to extend completely across the liquid crystal cell. Although the illuminator 14 can be separate from the liquid crystal cell 12, it is preferably bonded to the liquid crystal cell so as to form a unitized device.

In the operation of the liquid crystal device 10, the radioactive gas in the illuminator 14 emits low energy beta particles which strike the phosphor layer 46. This induces the emission of visible radiation which illuminates the liquid crystal cell 12. Thus, the liquid crystal device 10 is self-illuminating yet does not utilize any of the power available to operate the liquid crystal cell 12 to achieve the illumination of the liquid crystal cell 12. Since the illuminator 14 extends across the entire liquid crystal cell 12, the illuminator 14 will provide a uniform illumination of the liquid crystal cell. The illuminator 14 is made of flat plates and thus does not appreciably add to the overall thickness of the liquid crystal display 10, yet provides an overall illumination of the liquid crystal cell.

Figure 3:
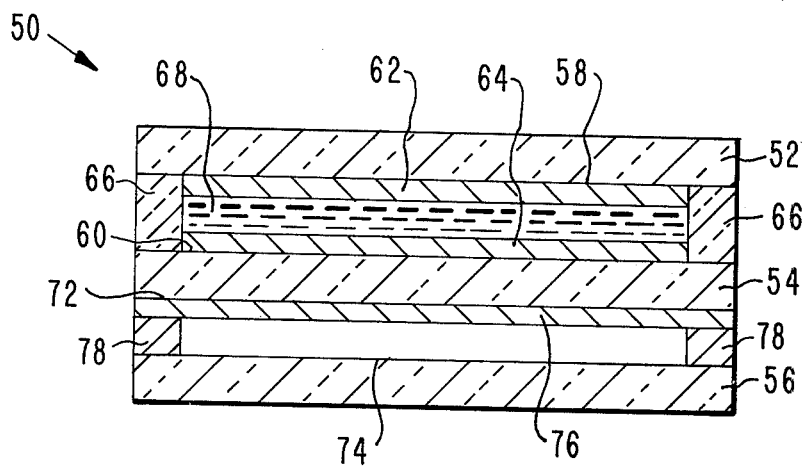
FIG. 3 is a sectional view of another form of the liquid crystal device of the present invention.

Referring to FIG. 3, another form of the liquid crystal display device of the present invention is generally designated as 50. The liquid crystal display device 50 includes three stacked plates 52, 54 and 56 of a transparent material, such as glass. The top plate 52 and middle plate 54 have opposed surfaces 58 and 60 respectively which are in spaced apart relation. A transparent electrode 62 is on the surface 58 of the plate 52, and an electrode 64 is on the surface 60 of the plate 54. At least one of the electrodes 62 and 64 is defined to form an alpha-numeric pattern. A seal 66 extends between the plates 52 and 54 around the periphery thereof to hold the plates in spaced apart relation and hermetically seal the space therebetween. The space between the plates 52 and 54 is filled with a liquid crystal material 68. Thus, the plates 52 and 54 form a liquid crystal cell.

The middle plate 54 and bottom plate 56 have opposed surfaces 72 and 74 respectively which are in spaced apart relation. A layer 76 of a cathodoluminescent phosphor is on the surface 72 of the plate 54. A seal 78 extends between the middle plate 54 and the bottom plate 56 around the periphery of the plates to hold the plates in spaced apart relation and hermetically seal the space between the plates. The space between the plates 54 and 56 is filled with a radioactive gas. Thus, the middle plate 54 and bottom plate 56 form an illuminator.

The liquid crystal display device 50 operates in the same manner as previously described with regard to the liquid crystal display device 10 shown in FIGS. 1 and 2. The liquid crystal display device 50 shown in FIG. 3 has the advantage over the liquid crystal display device 10 in that it includes fewer plates so that it is thinner.

We claim:

1. A liquid crystal display device comprising
   a liquid crystal cell including a pair of plates of transparent material having opposed, substantially flat surfaces in spaced apart relation,
   an electrode on each of said opposed surfaces, and
   a liquid crystal material between said opposed surfaces, in combination with
   an illuminator extending across one of said liquid crystal plates, said illuminator including
   a pair of spaced plates of soda-lime glass with the portion of the plates along the opposed surfaces in spaced apart relation being depleted of alkali metal ions,
   a cathodoluminescent phosphor on at least one of said opposed surfaces,
   a radioactive material between said illuminator plates and
   a hermetic seal around the periphery of said illuminator plates.

2. A liquid crystal display device in accordance with claim 1 in which the liquid crystal cell includes a first pair of plates and the illuminator includes a second pair of plates with the plates of the illuminator extending across the plates of the liquid crystal cell.

3. A liquid crystal display device in accordance with claim 2 including a separate seal between each pair of plates around the periphery of the plates, each of the seals forming a hermetically sealed chamber between its respective plates, the liquid crystal material is in the chamber between the first pair of plates and the radioactive material is in the chamber between the second pair of plates.

4. A liquid crystal device in accordance with claim 3 including a layer of a polarizing material on the outer surface of at least one of the first pair of plates.

5. A liquid crystal device in accordance with claim 4 including a separate layer of a polarizing material on the outer surface of each of the first pair of plates.

6. A liquid crystal device in accordance with claim 5 in which the one plate of the illuminator is bonded to the polarizing material layer on the outer surface of the one plate of the liquid crystal cell.

7. A liquid crystal display device in accordance with claim 1 including three stacked plates of transparent material with the middle plate and one of the outer plates forming the liquid crystal cell and the middle plate and the other outer plate forming the illuminator in which the plates of the illuminator are of a soda-lime glass with the portion of the plates along the opposed surfaces being depleted of alkali metal ions.

8. A liquid crystal display device in accordance with claim 7 including a separate seal between the middle plate and each of the outer plates, each of said seals forming a hermetic chamber between the respective plates, the chamber between the plates forming the liquid crystal cell being filled with the liquid crystal material and the chamber between the plates forming the illuminator being filled with the radioactive material.

* * * * *